Figure 1:
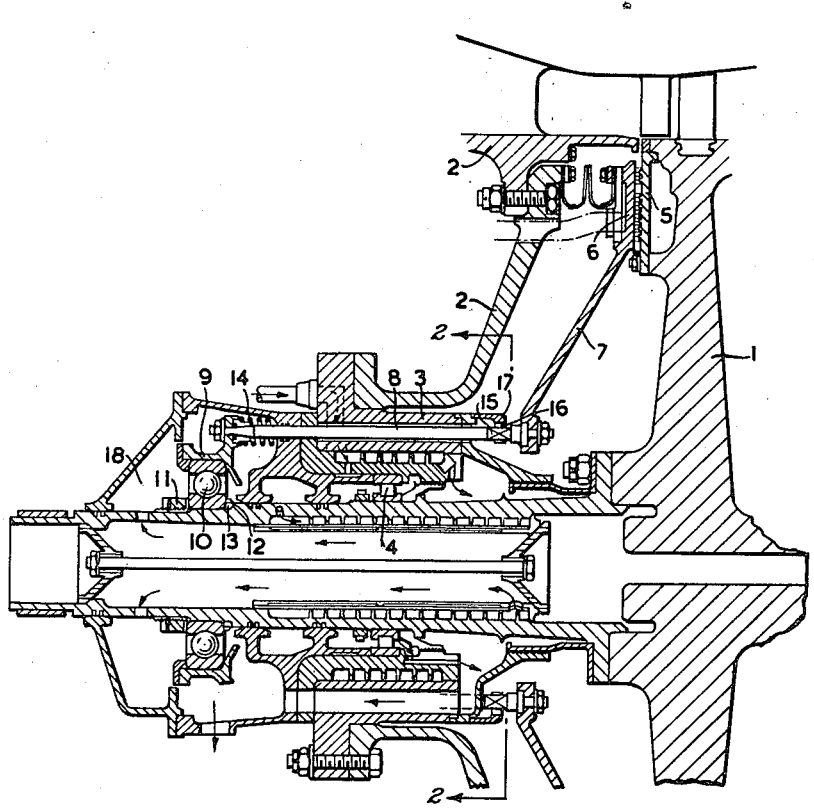

Feb. 26, 1952 L. ISLIP ET AL 2,587,326
SEAL FOR ROTORS OF TURBINES AND
LIKE FLUID FLOW MACHINES
Filed March 14, 1949

Inventors
Leonard Islip
By Sydney William Henry Perry
Stevens Davis Miller & Mosher
their Attorneys Patented Feb. 26, 1952

2,587,326

UNITED STATES PATENT OFFICE 2,587,326

SEAL FOR ROTORS OF TURBINES AND LIKE FLUID FLOW MACHINES

Leonard Islip, Rugby, and Sydney William Henry Perry, Knighton, England, assignors to Power Jets (Research and Development) Limited, London, England, a British company Application March 14, 1949, Serial No. 81,284
In Great Britain March 23, 1948

2 Claims. (Cl. 308—187.1)

This invention relates to seals for rotors of turbines and like fluid flow machines; more particularly the invention is concerned with the sealing of the axial clearance between the rotor end face of an axial flow machine and the stationary structure abutting thereon.

This sealing problem is commonly solved by the use of a labyrinth seal formed by axially extending and interdigitating annular strips or ribs provided on axially opposed parts of the rotor end face and the stationary structure. When the axial clearance to be sealed varies only within narrow limits the provision of a satisfactory seal in this way does not present serious difficulty. The invention on the other hand is concerned with the case in which, owing to the size of the parts and the magnitude of a differential temperature between the stator structure and the rotor, the axial clearance between these parts is subject to substantial variation, such that if the axially opposed sealing elements on the stator and rotor have a simple mounting, the axial clearance between the sealing elements must in some conditions be unacceptably large if rubbing of the sealing elements in other conditions is to be avoided. Accordingly the invention has particular application to long multistage turbine rotors operating at high temperatures and subject to considerable axial growth. In such a case the rotor can be axially located only at one end and it is therefore necessary at the other end to provide a seal which will accommodate a variation in axial clearance which may be very considerable.

The invention further has particular application to the case in which, owing to the use of high pressure working fluid, it is desired to provide the seal at or near the periphery of the rotor end face in order to minimise the creation of a large end load on the rotor due to the fluid pressure acting on the rotor end. A case in which the necessity for an arrangement of this kind is particularly prominent is that of a multistage turbine rotor in relation to which it is advantageous for some reason to locate the rotor axially at its low temperature end, thus involving the provision of a seal at the high pressure end of the rotor; that is to say the seal must be operating under its least favourable temperature and pressure conditions and the end load produced on the rotor by any exposure to the high pressure fluid will be a maximum, so that the seal must not only be a close one, but also near the periphery.

From the foregoing it will be appreciated that the invention has its primary application to a multistage gas turbine for industrial use in which there is not only the problem of high temperature associated with a gas turbine, but also the rotor has a large number of stages and is of massive construction and is therefore subject to very considerable axial growth. In such a case the problem may be further complicated by the necessity for cooling the main bearing at the high pressure end of the rotor, since that bearing may be totally enclosed by an annulus supplying hot working fluid to the turbine and consequently may operate in severe temperature conditions.

It is known, in connection with an overhung axial flow turbine rotor for an aircraft engine, in which the problem of varying axial clearance arises in a relatively mild form, to mount one part of an annular seal on the end face of the rotor and the other or non-rotating annular element of the seal on the housing of the main bearing of the rotor, this bearing incorporating a thrust bearing and the housing being externally supported in the main stationary structure of the machine for axial movement therein, the arrangement being such that the non-rotating sealing annulus and the bearing housing, by reason of their association with the thrust bearing, follow the growth of the rotor shaft in operating conditions and thus maintain a constant clearance between the elements of the seal. In this known form the seal is provided at an intermediate radius of the turbine rotor end face and is connected to the stationary structure by a flexible bellows preventing entry of high pressure working fluid behind the stationary element of the seal. An arrangement of this kind imposes limitations on the designer as to the range of axial clearance variation with which the seal can cope, and it is an object of the present invention to provide an arrangement which will give wider latitude in this respect. At the same time it has been borne in mind that the arrangement may be required to operate in conjunction with a cooled main bearing and in this connection the invention may be considered as related to the bearing construction forming the subject of British Patent No. 644,930, published on October 18, 1950.

Accordingly the invention provides a seal between the stationary structure and the end face of an adjacent axial flow rotor of a turbine or like fluid flow machine, comprising axially opposed annular sealing elements, one mounted on and rotating with the rotor, and the other supported on a plurality of axially extending guide members grouped around the shaft axis and passing through a part of the fixed stator structure which is one with a fixed housing for a shaft main bearing designed to support only radial loads (whereby growth of the shaft is not impeded), said guides being attached at their ends remote from the seal, to a housing, separate from that of the main bearing, of a thrust bearing mounted on the rotor shaft. By this means axial growth of the shaft will produce a corresponding axial movement of the non-rotating seal in order to maintain a constant seal clearance; at the same time considerable latitude will be afforded to the designer as to the amount of variation in clearance with which the arrangement can deal.

To provide for initial adjustment of the seal clearance the thrust bearing is preferably made adjustable axially on the shaft, for example by the provision of shims between the thrust bearing and a shoulder on one side thereof on the shaft, against which the thrust bearing is nipped by a locking ring threaded on the shaft at its other side. The non-rotating sealing annulus would be attached to the stationary structure of the fluid supply annulus by means of flexible bellows as in the previous proposal mentioned above in order to allow axial movement of the sealing element to take place whilst avoiding access of high pressure fluid to the rear face of the seal except near its periphery. To ensure that the non-rotating sealing element will always positively follow the thrust bearing upon growth of the shaft, it may be spring biassed in the sense of tending to open the seal, this spring bias being conveniently achieved by interposing light helical springs between the main bearing structure and the points of attachment of the guide members to the outer element of the thrust bearing.

It may be assumed that the sealing element and the ends of the guide members adjacent thereto will be at a much higher temperature than the thrust bearing and the corresponding ends of the guide members, this being especially the case if the invention is applied in conjunction with a cooled bearing such as that described in our copending application. Accordingly there may be a differential radial expansion as between opposite ends of the guide members and in order to deal with this problem it is proposed that these members at their hot ends should be located in radially extending guide ways which will fix the position of the guide members peripherally but allow their radial movement whilst keeping them in an axial plane of the shaft. The guide members in this case are made with ample radial clearance from all parts of the main bearing structure and any resulting tendency for them to droop and, thereby destroy the symmetry of the seal with respect to the shaft is prevented by the radial guide ways.

Figure 2:
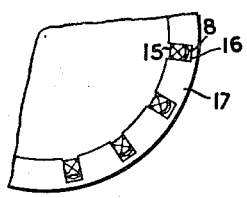

An example of construction of the invention is illustrated in the accompanying drawings as applied to a cooled bearing in accordance with our British Patent No. 644,930, Figure 1 of the drawings being an axial section of part of a turbine rotor and its nozzle structure and associated main bearing with a seal in accordance with the present invention applied thereto, and Figure 2 being a part cross-section on the line 2—2 in Figure 1.

In the drawing 1 represents the upstream end of a multistage gas turbine rotor, 2 the main stator structure affording support for the fluid supply annulus and the main shaft bearing, and 3 the main bearing housing. The construction of the main bearing housing 3 follows that described in the specification of the said British Patent No. 644,930 with the exception of certain modifications which are mentioned below. It will not therefore be further described except to mention that it is associated with a flow of fluid coolant following the paths indicated by the arrows and associated also with internal cooling of the main shaft.

The housing 3 encloses the main bearing 4 of the turbine shaft, which bearing is designed to sustain only radial loads. The seal consists of a sealing annulus 5 mounted on and rotating with the rotor and a non-rotating sealing annulus 6, the two sealing annuli having interdigitating sealing elements to form a labyrinth seal in the usual way. The non-rotating sealing annulus 6 is carried by a conical supporting member 7 which at its inner radius is mounted on the ends of a plurality of guide rods 8 which are arranged parallel to one another and the shaft axis and are distributed around the shaft. The guide rods 8 pass with ample clearance through the fixed bearing housing 3 and are attached at their ends remote from the seal to the outer element 9 of a thrust bearing 10 which is located on the shaft by being nipped between a securing ring 11 and a shoulder 12 on the shaft, provision being made for axial adjustment of the position of the thrust bearing by inserting shims at 13. Light springs 14 are interposed between the thrust bearing housing 9 and the main bearing housing 3 in order to bias the guide rods to the left. At their ends adjacent to the seal the guide rods 8 are located in their proper axial planes by the engagement of squared parts 15 of the rods engaging in radial slots 16 in a ring 17 mounted on the main bearing housing (see also Figure 2).

The arrangement is thereby such that the non-rotating sealing element will follow any changes in length of the rotor shaft, and will do so positively by reason of the springs 14. At the same time any tendency of the guide rods to droop due to the generous radial clearance between them and the main bearing housing will be prevented by their engagement in their guide slot.

The thrust bearing 10 is contained in a chamber 18 which is a modified version of the chamber 16 in Figure 1 of the drawings contained in the specification of the said British Patent No. 644,930.

It is assumed that the rotor is located in the axial sense by a thrust bearing at its opposite end.

It will be appreciated that the construction can allow of a very large axial growth of the rotor and so the designer has considerable freedom of action.

We claim:

1. A turbine or like rotary fluid flow machine having a rotor, a journal element on said rotor, a journal bearing embracing said journal element externally, stationary structure supporting said journal bearing, a first sealing element mounted on and rotatable with said rotor, a second non-rotatable sealing element axially opposed to the first and disposed therefrom toward said journal bearing supporting structure, a thrust bearing engaging said journal element on the side of said journal bearing remote from said rotor and a housing therefor separate from and movable relative to said stationary structure, and a plurality of axially extending guide members grouped around said journal element and passing through said journal bearing supporting structure and connecting rigidly said thrust bearing housing to said second sealing element, the latter being adapted for at least limited axial movement relatively to said stationary structure.

2. A turbine as claimed in claim 1, wherein said stationary structure is apertured to admit each of said guide members, each aperture being elongated in the radial direction to permit relative radial movement of the guide member contained therein while maintaining relative circumferential location of that member.

LEONARD ISLIP.
SYDNEY WILLIAM HENRY PERRY.

REFERENCES CITED

The following references are of record in the file of this patent:

UNITED STATES PATENTS

| Number | Name | Date |
|---|---|---|
| 1,168,273 | Banner | Jan. 18, 1916 |
| 1,806,515 | Zoelly | May 19, 1931 |
| 1,932,214 | Hornschuch | Oct. 24, 1933 |